Feb. 9, 1926.  
F. TINKER  
1,572,626
APPARATUS FOR THE PRODUCTION OF GASOLINE
Filed June 7, 1923
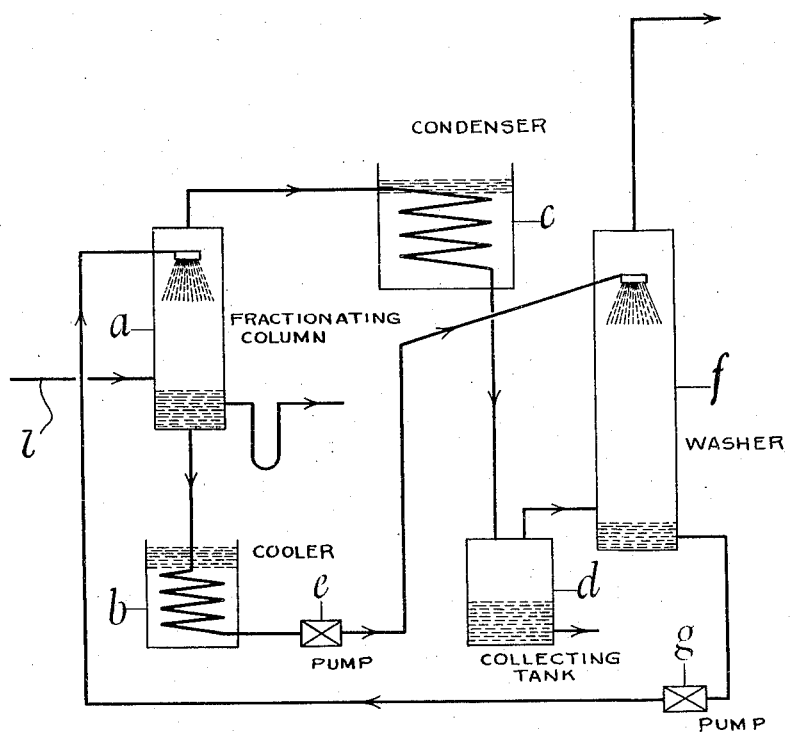
Inventor  
F. Tinker  
By Marks Clerk  
Attys.

Patented Feb. 9, 1926.

1,572,626

UNITED STATES PATENT OFFICE.

FRANK TINKER, OF SUTTON COLDFIELD, ENGLAND.

APPARATUS FOR THE PRODUCTION OF GASOLINE.

Application filed June 7, 1923. Serial No. 643,968.

*To all whom it may concern:*

Be it known that I, FRANK TINKER, a subject of the King of Great Britain, residing at "Westfield," Foley Road, Streetly, Sutton Coldfield, in the county of Warwick, England, have invented certain new and useful Improvements Relating to Apparatus for the Production of Gasoline, of which the following is a specification.

In the production of gasoline or like motor spirits by distillation processes, such as those carried out in ordinary "topping" plants, or by the methods described in my former Patents Nos. 1,393,184, and 1,535,507 and application Serial No. 590,480, certain conditions are desirable in order that the best and most economical results may be obtained. In the fractionating, or dephlegmating column, adequate cooling is necessary for proper condensation and separation of the heavier constituents from the gasoline vapour which is subsequently liquefied in the condenser. And to recover gasoline carried away in the permanent gas withdrawn from the condenser, a gas washing plant is necessary. There are several ordinary methods of effecting these conditions, but all of them involve the use of a relatively large amount of extra plant. Thus, cooling apparatus would be required for use with the fractionating column, and in addition, for washing the gas obtained from the condenser there would be required a washing plant with its necessary oil storage tanks, and an additional distillation plant for separating the gasoline from the oil used in the washing plant.

The object of the present invention is to enable the required cooling of vapour in the fractionating column and the recovery of gasoline carried out of the system by the permanent gas to be effected in a very simple manner, with a minimum of additional plant.

The invention comprises, the employment in conjunction with the fractionating, or dephlegmating column, of a circulating system, by which oil is withdrawn from the said column, and is returned to it after cooling; the utilization of the cooled oil before its return to the fractionating column for washing the gasoline laden permanent gas; and the re-evaporation of the recovered gasoline in the fractionating column.

The accompanying diagram illustrates one mode of carrying the invention into effect.

Referring to the diagram, oil withdrawn from the lower end of the fractionating column *a* is passed through any suitable cooler *b* and is returned to the top of the column where it descends in the form of a stream, and by mixing with the incoming vapour introduced through the line 1 effects the amount of cooling necessary to throw out the heavier constituents, leaving the gasoline in the form of vapour which is, as usual, liquefied later in the condenser *c*, the liquefied distillate flowing thence into the collecting tank *d*.

Before the cooled oil is returned to the fractionating column it is passed by the pump *e* through a washer *f* where it is utilized for separating gasoline from the gas which results from the distillation or cracking processes and is withdrawn from the tank *d*. The cooled oil returned from the washer *f* by the pump *g* to the fractionating column therefore contains the recovered gasoline. Ordinarily a separate distillation plant would be required to separate the gasoline from the washing oil. But in accordance with this invention the heat of the vapours in the fractionating column is used. When the cooled oil is delivered into the fractionating column and caused to pass through the incoming hot vapour, the gasoline is re-evaporated from the oil, and is passed on with the other vapour to the condenser.

In carrying out the invention any suitable cooling and washing and other necessary apparatus may be employed.

Having thus described my invention what I claim as new and desire to secure by Letters Patent is:—

In apparatus for the production of gasoline and like motor spirits by distillation processes, the combination with a fractionating column, of a condenser, means for conducting vapour from the fractionating column to the condenser, a collecting tank, means for conducting condensed liquid, gas and vapour from the condenser to the collecting tank, a washer, means for passing vapour and gas from the collecting tank to the washer, a cooler, means for passing condensate from the fractionating column to the cooler, means for conveying cooled condensate from the cooler to the washer, and means for returning liquid from the washer to the fractionating column, substantially as described.

In testimony whereof I have signed my name to this specification.

FRANK TINKER.